US008310469B2

(12) United States Patent
Park et al.

(10) Patent No.: US 8,310,469 B2

(45) **Date of Patent: *Nov. 13, 2012**

(54) DISPLAY DEVICE AND DRIVING METHOD THEREOF

(75) Inventors: Kee-Chan Park, Anyang-si (KR); Shang-Min Yhee, Seoul (KR); Doo-Hyung Woo, Anyang-si (KR); Zhi Feng Zhan, Yongin-si (KR); Seong-Il Park, Seoul (KR); Seung-Kyu Lee, Suwon-si (KR); Yang-Hwa Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 936 days.

This patent is subject to a terminal disclaimer.

(21) Appl. No.: 11/948,284

(22) Filed: Nov. 30, 2007

(65) Prior Publication Data

US 2008/0158205 A1 Jul. 3, 2008

(30) Foreign Application Priority Data

Dec. 27, 2006 (KR) ........................ 10-2006-0134801

(51) Int. Cl.
*G06F 3/038* (2006.01)

(52) U.S. Cl. ............ 345/204; 345/77; 345/82; 345/211; 315/169.3

(58) Field of Classification Search .............. 345/76–83, 345/211, 204; 315/169.3
See application file for complete search history.

(56) References Cited

U.S. PATENT DOCUMENTS

| | | | | |
|---|---|---|---|---|
| 6,727,881 | B1 | 4/2004 | Albert et al. | |
| 6,937,215 | B2 | 8/2005 | Lo | |
| 7,460,093 | B2 * | 12/2008 | Ozawa et al. | 345/76 |
| 7,545,354 | B2 * | 6/2009 | Ha et al. | 345/83 |
| 7,649,515 | B2 * | 1/2010 | Ozawa et al. | 345/82 |
| 2004/0090434 | A1 | 5/2004 | Miyazawa | |
| 2004/0150613 | A1 | 8/2004 | Li et al. | |
| 2004/0263741 | A1 | 12/2004 | Koyama et al. | |
| 2005/0110730 | A1 * | 5/2005 | Kim et al. | 345/82 |
| 2005/0200572 | A1 | 9/2005 | Weng | |

(Continued)

FOREIGN PATENT DOCUMENTS

CA 1405785 A 3/2003

(Continued)

OTHER PUBLICATIONS

European Search Report of Mar. 25, 2010 corresponding to European Patent Application No. 07024473.6.

*Primary Examiner* — Lun-Yi Lao
*Assistant Examiner* — Sosina Abebe
(74) *Attorney, Agent, or Firm* — Cantor Colburn LLP

(57) ABSTRACT

A display device includes a light emitting element, a capacitor, a driving transistor, and first to third switching units. The capacitor is connected between a first node and a second node. The driving transistor has an input terminal connected with a first voltage, an output terminal, and a control terminal connected with the second node, and it outputs a driving current to the light emitting element. The first switching unit selects and connects one of a data voltage and a second voltage to the first node. The second switching unit switches a connection between the second voltage and the second node. The third switching unit selects and connects one of the second node and the light emitting element to the output terminal of the driving transistor.

15 Claims, 8 Drawing Sheets

U.S. PATENT DOCUMENTS

2007/0040772 A1* 2/2007 Kim ................................ 345/76
2007/0124633 A1* 5/2007 Kim .............................. 714/726

FOREIGN PATENT DOCUMENTS

CN 101405785 A 4/2009
EP 1536405 A2 6/2005
EP 1624437 A2 2/2006
EP 1708162 A1 10/2006
EP 2026318 A1 2/2009
JP 2003-005710 1/2003
JP 2003-177712 6/2003
JP 2004-054239 2/2004
JP 2005-037413 2/2005
JP 2005157244 6/2005
JP 2005157308 6/2005
JP 2006078911 A 3/2006
JP 2006-138953 6/2006
JP 2006-208743 8/2006
JP 2007133369 5/2007
KR 100543013 1/2006
KR 100560780 3/2006
KR 1020060054603 5/2006
KR 100589972 6/2006
KR 100602352 7/2006
WO 2007138729 12/2007

* cited by examiner

DISPLAY DEVICE AND DRIVING METHOD THEREOF

This application claims priority to Korean Patent Application No. 10-2006-0134801 filed on Dec. 27, 2006, and all the benefits accruing therefrom under 35 U.S.C. §119, the contents of which in its entirety are herein incorporated by reference.

BACKGROUND OF THE INVENTION (a) Field of the Invention

The present invention relates to an organic light emitting device and a driving method thereof. More particularly, the present invention relates to an organic light emitting device having improved screen uniformity, and a driving method thereof.

(b) Description of the Related Art

In general, active flat panel displays respectively include a plurality of pixels arranged in a matrix, and control the light intensity of each pixel on the basis of predetermined luminance information to display images. Among the active flat panel displays, an organic light emitting device is a display in which fluorescent organic materials are electrically excited to display images. The organic light emitting device is self-emissive and has low power consumption, a large reference viewing angle, and a high pixel response speed. Accordingly, the organic light emitting device is suitable for displaying a motion picture at a high definition.

The organic light emitting device includes organic light emitting diodes ("OLEDs") and thin film transistors ("TFTs") for controlling the OLEDs. The TFTs are classified as polysilicon TFTs and amorphous silicon TFTs, depending on the type of active layer.

Since the amorphous silicon can be deposited at a low temperature to form a thin film, it can be applied to a display that has a glass substrate having a low melting point. However, amorphous semiconductor has low electron mobility, which hinders a display device from being enlarged. In addition, when the amorphous silicon TFT is continuously supplied with a direct voltage at its control terminal, a threshold voltage of the amorphous silicon TFT is changed which degrades the performance of the TFT and thus, a reduction of the life span of the organic light emitting device may result.

Therefore, it is required to apply a polysilicon TFT having high electron mobility, excellent high frequency operation characteristics, and a low leakage current. Particularly, a low temperature polysilicon ("LTPS") backplane can remarkably solve the problem of the life span. However, laser shot marks that are made in a laser crystallization process cause deviation of the threshold voltages of driving transistors in a device, thereby causing deterioration in screen uniformity.

BRIEF SUMMARY OF THE INVENTION

Exemplary embodiments of a display device according to the present invention include a light emitting element, a capacitor, a driving transistor, a first switching unit, a second switching unit, and a third switching unit. The light emitting element emits light having an intensity dependent on a magnitude of a driving current. The capacitor is connected between a first node and a second node. The driving transistor outputs the driving current and has an input terminal connected with a first voltage, an output terminal, and a control terminal connected with the second node. The first switching unit selects one of a data voltage and a second voltage, and connects a selected voltage to the first node. The second switching unit switches a connection between the second voltage and the second node. The third switching unit selects one of the second node and the light emitting element, and connects a selected one of the second node and the light emitting element to the output terminal of the driving transistor.

The third switching unit may connect the second node to the output terminal of the driving transistor while the first switching unit connects the data voltage to the first node. The third switching unit may connect the light emitting element to the output terminal of the driving transistor while the first switching unit connects the second voltage to the first node. The second switching unit may connect the second node to the second voltage and may then disconnect the second node from the second voltage while the first switching unit connects the data voltage to the first node.

The capacitor may store a threshold voltage of the driving transistor while the first switching unit connects the data voltage to the first node and the third switching unit connects the second node to the output terminal of the driving transistor.

The first switching unit may include a first switch and a second switch. The first switch may switch a connection between the data voltage and the first node. The second switch may switch a connection between the second voltage and the first node. The second switching unit may include a third switch. The third switching unit may include a fourth switch and a fifth switch.

The fourth switch may switch a connection between the second node and the output terminal of the driving transistor. The fifth switch may switch a connection between the light emitting element and the output terminal of the driving transistor.

The first, second, fourth, and fifth switches may be controlled by a first control signal.

The first switch and the fourth switch may be field effect transistors ("FETs") of a first channel type, and the second switch and the fifth switch may be FETs of a second channel type, and the second channel type may be different from the first channel type.

The third switch may be controlled by a second control signal, and may be an FET of the first channel type.

The driving transistor may have the first channel type.

The first to fifth switches and the driving transistor may include polysilicon.

The driving current may not be dependent on a threshold voltage of the driving transistor, and may depend on the data voltage and the second voltage.

Other exemplary embodiments of a display device according to the present invention include a light emitting element, a first capacitor, a driving transistor, a first switching transistor, a second switching transistor, a third switching transistor, a fourth switching transistor, and a fifth switching transistor. The first capacitor is connected between a first node and a second node. The driving transistor has an input terminal connected with a first voltage, an output terminal, and a control terminal connected with the second node. The first switching transistor is controlled by a first control signal, and is connected between a second voltage and the first node. The third switching transistor is controlled by a second control signal, and is connected between the second node and the second voltage. The fourth switching transistor is controlled by the first control signal, and is connected between the second node and the output terminal of the driving transistor. The fifth switching transistor is controlled by the first control signal, and is connected between the second node and the output terminal of the driving transistor.

The first, third, and fourth switching transistors may have a channel type that is different from a channel type of the second and fifth switching transistors.

The driving transistor, the second switching transistor, and the fifth switching transistor may be p-channel field effect transistors.

The first to fifth switching transistors and the driving transistor may include polysilicon.

In sequentially consecutive first to third periods, the first, third, and fourth switching transistors may turn on and the second and fifth switching transistors may turn off during the first period, the first and fourth switching transistors may turn on and the second, third, and fifth switching transistors may turn off during the second period, and the second and fifth switching transistors may turn on and the first, third, and fourth switching transistors may turn off during the third period.

The first control signal may be a scanning signal from a scanning driver and the second control signal may be a light-emission signal from an emission driver.

Exemplary embodiments of a driving method according to the present invention drive a display device having a light emitting element, a capacitor connected between a first node and a second node, and a driving transistor having an input terminal, an output terminal, and a control terminal that is connected to the second node. The driving method includes connecting a data voltage to the first node and connecting the second node to the output terminal of the driving transistor, connecting a second voltage to the second node, disconnecting the second node from the second voltage, and connecting the second voltage to the first node and connecting the light emitting element to the output terminal of the driving transistor.

Connecting the second voltage to the second node and disconnecting the second node from the second voltage may be sequentially performed while the data voltage is connected to the first node, and while the second node is connected to the output terminal of the driving transistor. The second voltage may be connected to the first node and the light emitting element may be connected to the output terminal of the driving transistor while the second node and the second voltage are disconnected from each other.

BRIEF DESCRIPTION OF THE DRAWINGS

The above and other aspects, features, and advantages of the present invention will become more apparent by describing in further detail exemplary embodiments thereof with respect to the accompanying drawings, in which.

DETAILED DESCRIPTION OF THE INVENTION

Figure 1:
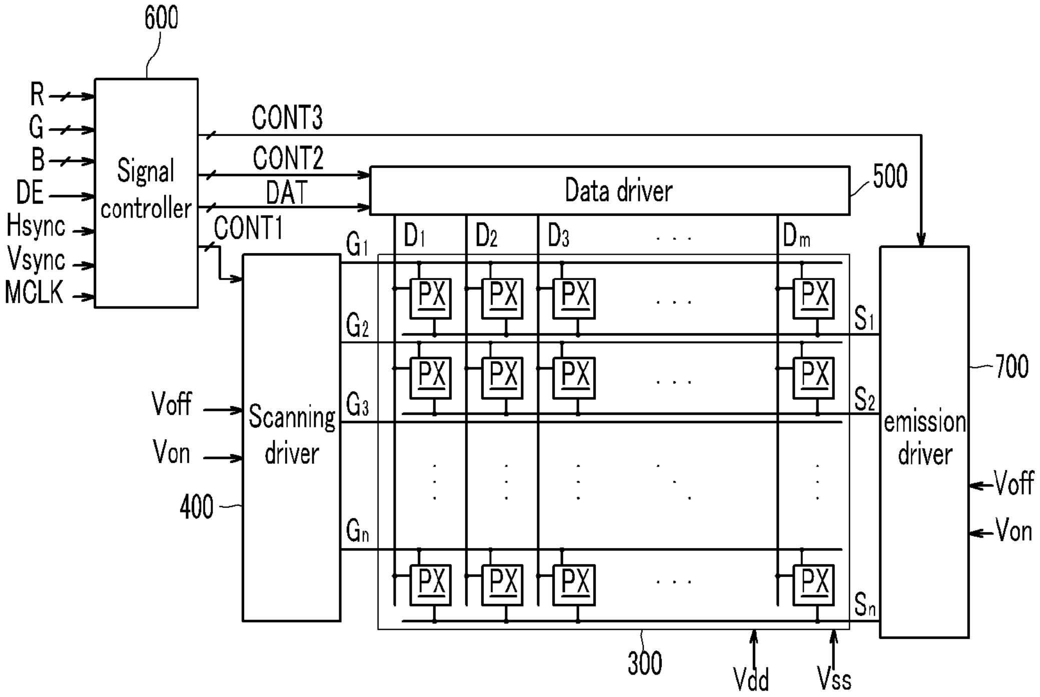
FIG. 1 is a block diagram of an exemplary embodiment of an organic light emitting device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being “on” another element, it can be directly on the other element or intervening elements may be present therebetween. In contrast, when an element is referred to as being “directly on” another element, there are no intervening elements present. As used herein, the term “and/or” includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present invention will be described more fully hereinafter with reference to the accompanying drawings, in which exemplary embodiments of the invention are shown.

An organic light emitting device according to an exemplary embodiment of the present invention will now be described in detail with reference to FIG. 1 to FIG. 3.

Figure 2:
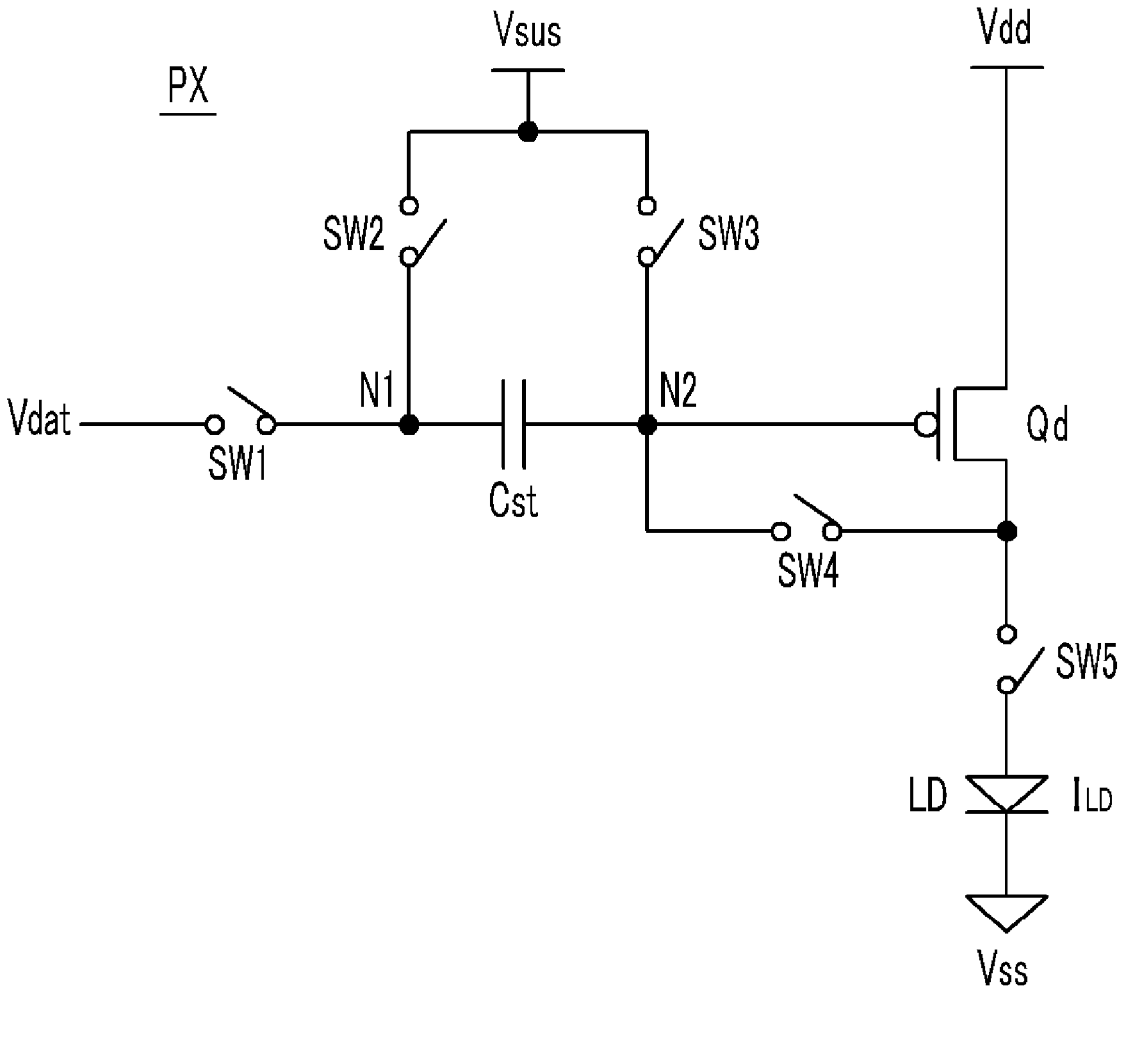
FIG. 2 and FIG. 3 show equivalent circuit diagrams of exemplary embodiments of a pixel of an exemplary organic light emitting device according to the present invention.
Figure 3:
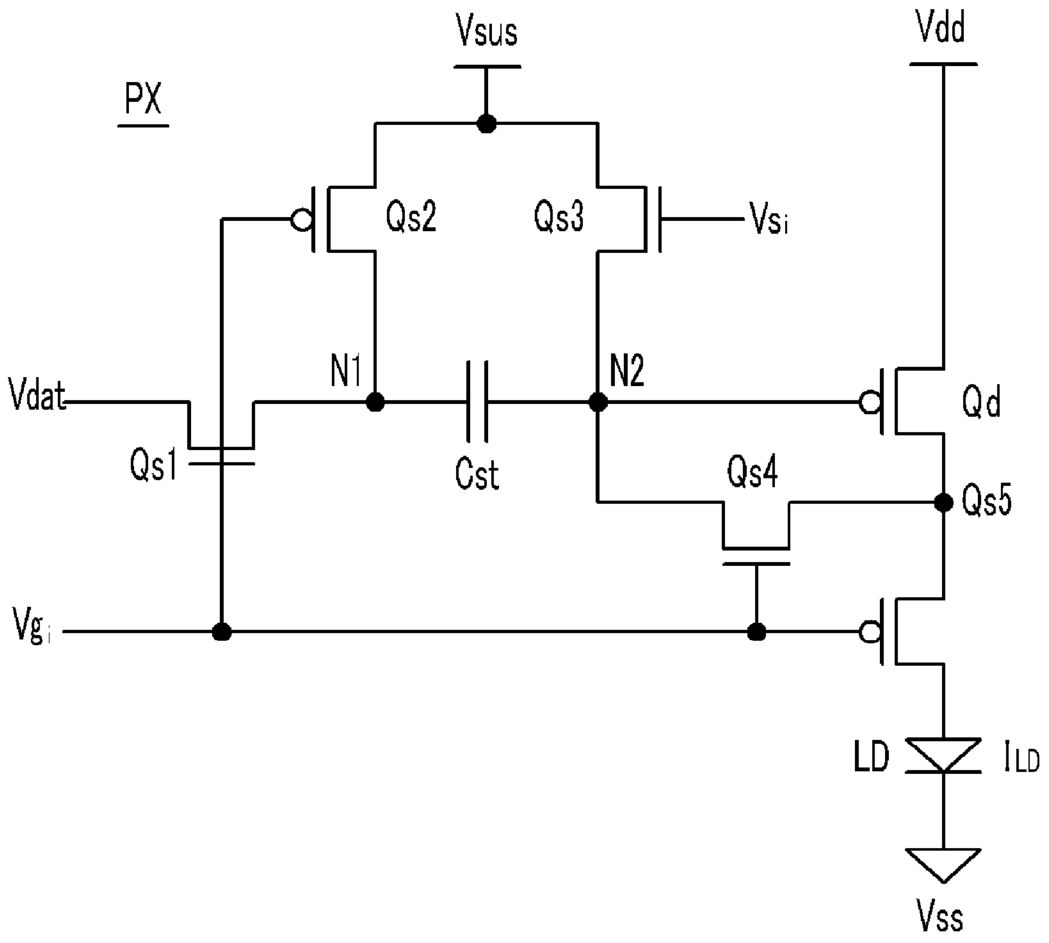

FIG. 1 is a block diagram of an exemplary embodiment of an organic light emitting device according to the present invention, and FIG. 2 and FIG. 3 show equivalent circuit diagrams of exemplary embodiments of one pixel of an exemplary organic light emitting device according to the present invention.

Referring to FIG. 1, the organic light emitting device includes a display panel 300, a scanning driver 400, a data driver 500, an emission driver 700, and a signal controller 600.

The display panel 300 includes a plurality of signal lines $G_1$ to $G_n$, $D_1$ to $D_m$, and $S_1$ to $S_n$, a plurality of voltage lines (not shown), and a plurality of pixels PX that are connected to the signal lines $G_1$ to $G_n$, $D_1$ to $D_m$, and $S_1$ to $S_n$, and are arranged approximately in a matrix shape.

The signal lines $G_1$-$G_n$, $D_1$-$D_m$, and $S_1$-$S_n$ include a plurality of scanning signal lines $G_1$ to $G_n$, also known as gate lines, transmitting scanning signals, a plurality of data lines $D_1$ to $D_m$ transmitting data signals, and a plurality of light-emission signal lines $S_1$ to $S_n$ transmitting light-emission signals. The scanning signal lines $G_1$ to $G_n$ and the light-emission signal lines $S_1$ to $S_n$ substantially extend in a row direction, such as a first direction, in parallel with one another. The data lines $D_1$ to $D_m$ substantially extend in a column direction, such as a second direction, in parallel with one another. The first direction may be substantially perpendicular with the second direction.

The voltage lines of the signal lines include driving voltage lines (not shown) transmitting a driving voltage.

As shown in FIG. 2, each pixel PX of the organic light emitting device includes an organic light emitting element LD, a driving transistor Qd, a capacitor Cst, and five switches SW1 to SW5. The first to fifth switches SW1 to SW5 shown in FIG. 2 may be switching transistors Qs1 to Qs5 as shown in FIG. 3.

Referring to FIGS. 2 and 3, the driving transistor Qd has an output terminal, an input terminal, and a control terminal. The control terminal of the driving transistor Qd, such as a gate electrode, is connected to the capacitor Cst at a node N2, the input terminal, such as a source electrode, is connected to a driving voltage Vdd, and the output terminal, such as a drain electrode, is connected to the switching transistor Qs5.

One terminal of the capacitor Cst is connected with the control terminal of the driving transistor Qd at the node N2, and the other terminal is connected with the switching transistor Qs1 at a node N1.

The switching transistor Qs1 is connected between a data voltage Vdat and the node N1. The switching transistor Qs2 is connected between a sustain voltage Vsus and the node N1, and the switching transistor Qs3 is connected between the sustain voltage Vsus and the node N2. The switching transistor Qs4 is connected between the node N2 and the output terminal of the driving transistor Qd, and the switching transistor Qs5 is connected between the output terminal of driving transistor Qd and the organic light emitting element LD.

The switching transistors Qs1, Qs2, Qs4, and Qs5 operate in response to the scanning signal $Vg_i$, from the scanning signal lines G1 to Gn, and the switching transistor Qs3 operates in response to the light-emission signal $Vs_i$, from the light-emission signal lines S1 to Sn. The switching transistors Qs1 and Qs2 select one of the data voltage Vdat and the sustain voltage Vsus and connect the selected one to the node N1. The switching transistor Qs3 switches a connection between the sustain voltage Vsus and the node N2, and the switching transistors Qs4 and Qs5 select one of the node N2 and the light emitting element LD and connect the selected one to the output terminal of the driving transistor Qd. The switching transistors Qs1 and Qs2 may constitute a first switching unit, the switching transistor Qs3 may constitute a second switching unit, and the switching transistors Qs4 and Qs5 may constitute a third switching unit.

The switching transistors Qs1, Qs3, and Qs4 are n-channel polysilicon field effect transistors ("FETs"), and the switching transistors Qs2 and Qs5 and the driving transistor Qd are p-channel polysilicon FETs. An example of the FET is a thin film transistor ("TFT"), and the TFT may contain amorphous silicon rather than polysilicon. The channel type of each of the switching transistors Qs1 to Qs5 and the driving transistor Qd may be reversed, and accordingly, signal waveforms for driving them may be reversed.

An anode and a cathode of the organic light emitting element LD are respectively connected to the switching transistor Qs5 and a common voltage Vss. The organic light emitting element LD emits light having an intensity according to the magnitude of the output current $I_{LD}$ of the driving transistor Qd that is supplied through the switching transistor Qs5 so as to display an image. The magnitude of the output current $I_{LD}$ depends on the voltage difference between the control terminal and the input terminal of the driving transistor Qd.

Referring to FIG. 1 again, the scanning driver 400 is connected with the scanning signal lines $G_1$ to $G_n$ of the display panel 300 and applies scanning signals $Vg_i$ to the scanning signal lines $G_1$ to $G_n$. Each of the scanning signals $Vg_i$ is a combination of a high voltage Von and a low voltage Voff.

The emission driver 700 is connected with emission signal lines $S_1$ to $S_n$ of the display panel 300, and applies emission signals $Vs_i$ to the emission signal lines $S_1$ to $S_n$. Each of the emission signals $Vs_i$ is a combination of the high voltage Von and the low voltage Voff.

The high voltage Von can turn on the switching transistors Qs1, Qs3, and Qs4 and turn off the switching transistors Qs2 and Qs5, and the low voltage Voff can turn off the switching transistors Qs1, Qs3, and Qs4 and turn on the switching transistors Qs2 and Qs5. The sustain voltage Vsus is sufficiently low to turn off the switching transistors Qs1, Qs3, and Qs4 and turn on the switching transistors Qs2 and Qs5, as does the low voltage Voff.

The data driver 500 is connected with the data lines $D_1$ to $D_m$ of the display panel 300 and applies the data voltages Vdat to the data lines $D_1$ to $D_m$.

The signal controller 600 controls the scanning driver 400, the data driver 500, and the emission driver 700.

The respective elements 400, 500, 600, and 700 may be directly mounted on the display panel 300 in the form of at least one integrated circuit ("IC") chip, may be mounted on a flexible printed circuit ("FPC") film (not shown) that is mounted on the display panel 300 in the form of a tape carrier package ("TCP"), or may be mounted on a separate printed circuit board ("PCB") (not shown). Alternatively, the elements 400, 500, 600, and 700 may be integrated into the display panel 300 together with, for example, the signal lines $G_1$ to $G_n$ and $D_1$ to $D_m$ and the transistors Qs1 to Qs5 and Qd. In another exemplary embodiment, the elements 400, 500, 600, and 700 may be integrated into a single chip. In this case, at least one circuit of the elements 400, 500, 600 and 700 may be disposed outside the single chip.

The operation of the organic light emitting device will be described in detail with reference to FIG. 1, FIG. 3, and FIG. 4 to FIG. 7.

Figure 4:
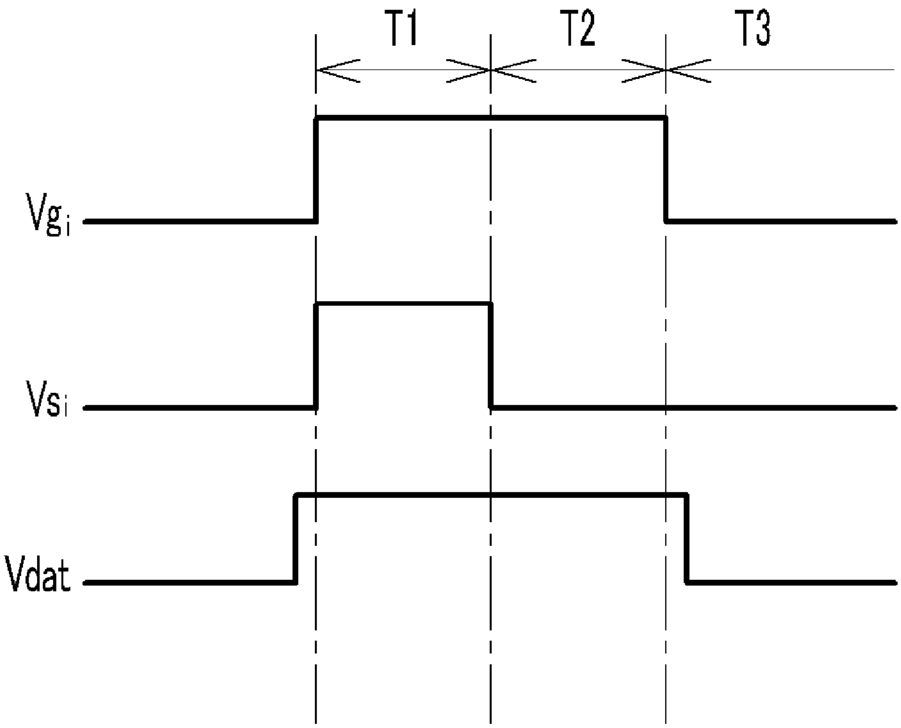
FIG. 4 is an exemplary timing diagram illustrating an exemplary embodiment of driving signals of an exemplary organic light emitting device according to the present invention.
Figure 5:
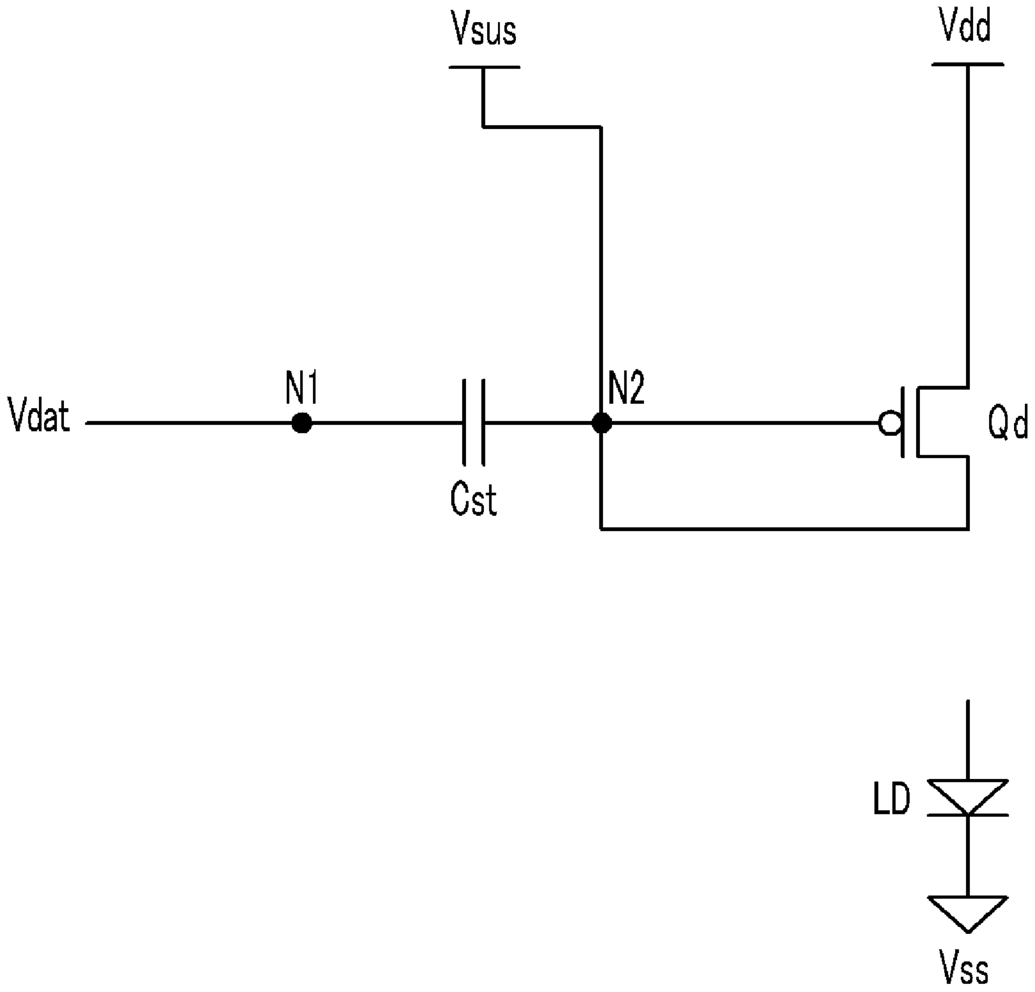
FIG. 5 to FIG. 7 show equivalent circuit diagrams of an exemplary pixel in respective periods illustrated in FIG. 4.
Figure 6:
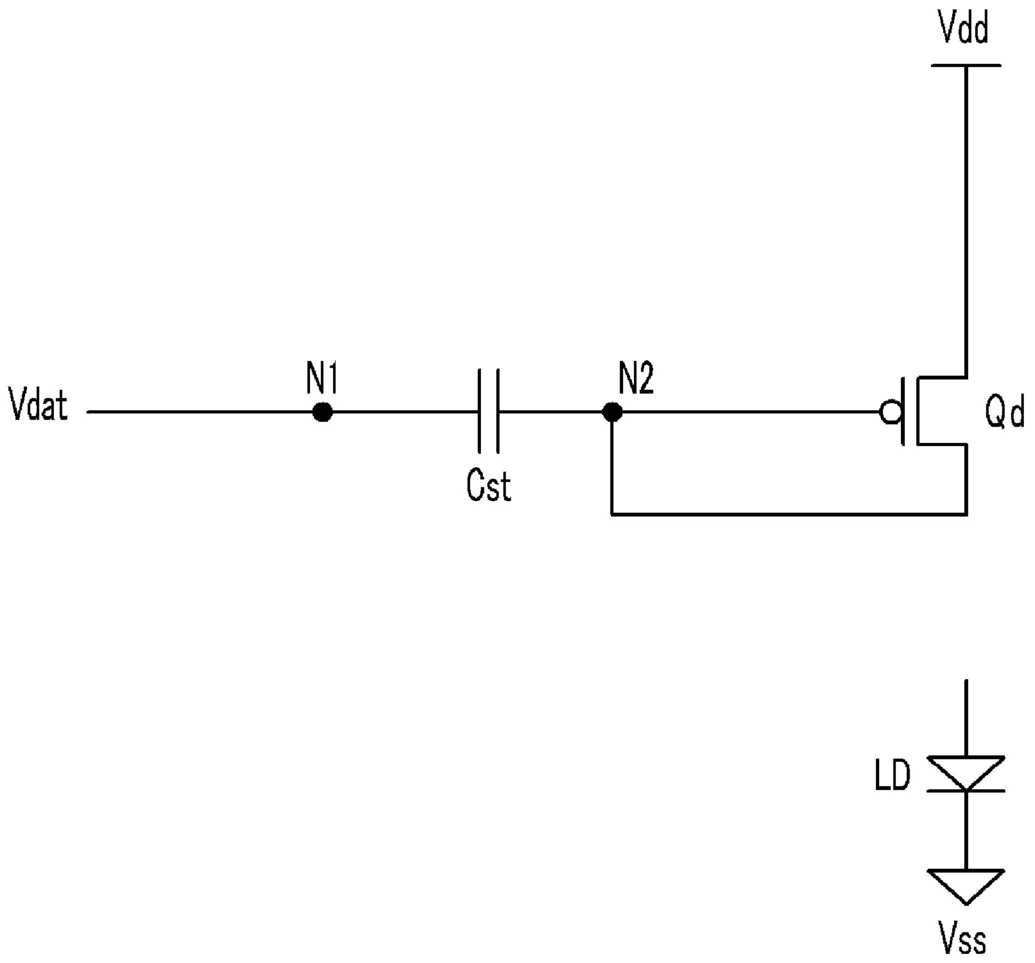
Figure 7:
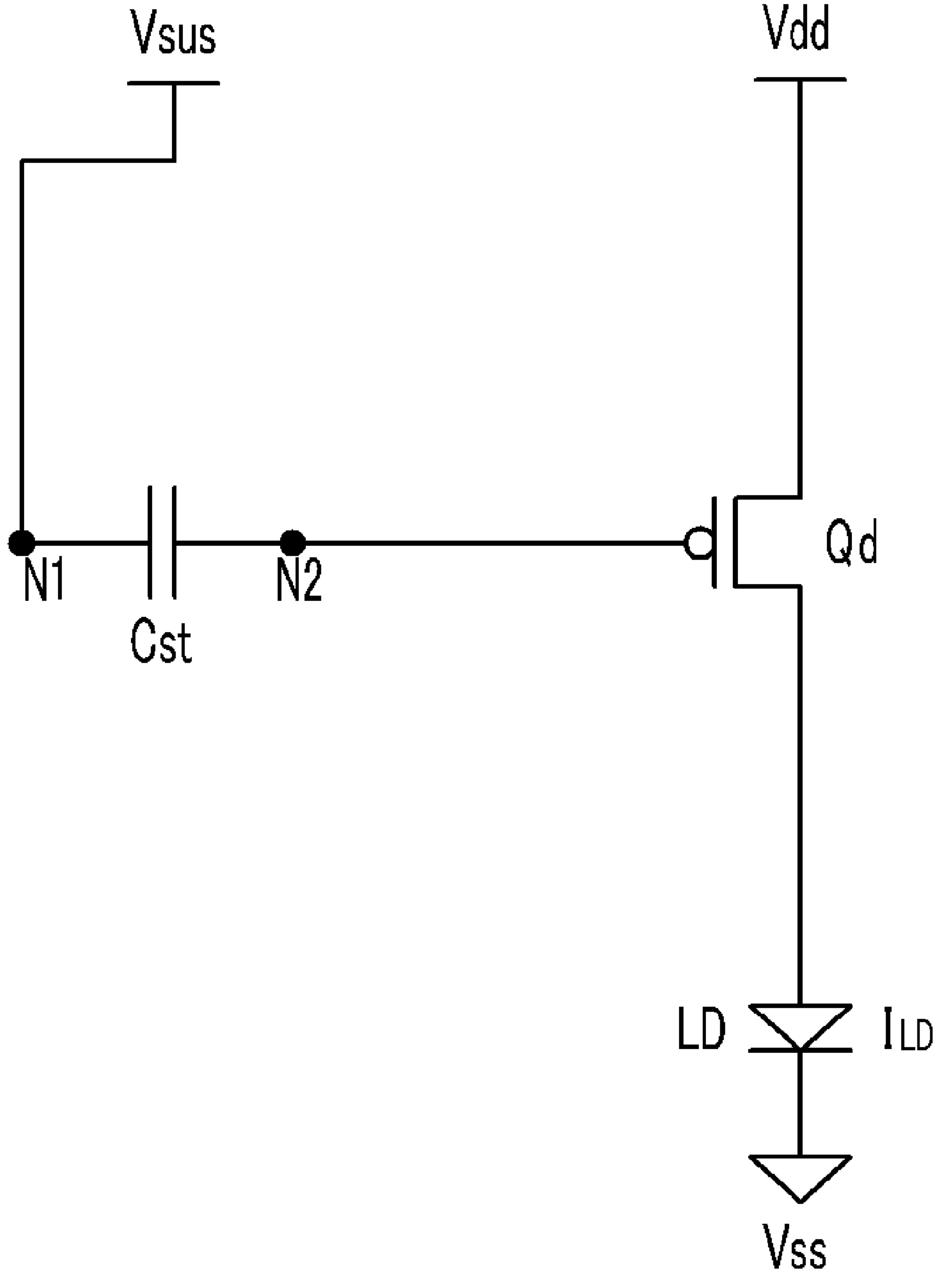

FIG. 4 is an exemplary timing diagram illustrating driving signals of an exemplary organic light emitting device according to an exemplary embodiment of the present invention, and FIG. 5 to FIG. 7 show equivalent circuit diagrams of an exemplary pixel in respective periods illustrated in FIG. 4.

The signal controller 600 receives input image signals R, G, and B and input control signals from an external graphics controller (not shown) for controlling the display thereof. The input image signals R, G, and B contain luminance information of the pixels PX, and the luminance has a predetermined number of grays (e.g., 1024($=2^{10}$), 256 ($=2^8$), or 64 ($=2^6$)).

The input control signals, for example, include a vertical synchronization signal Vsync, a horizontal synchronizing signal Hsync, a main clock signal MCLK, and a data enable signal DE.

On the basis of the input image signals R, G, and B and the input control signals, the signal controller 600 processes the input image signals R, G, and B to be suitable for the operation conditions of the display panel 300, and generates scanning control signals CONT1, data control signals CONT2, and emission control signals CONT3. The signal controller 600 sends the scanning control signals CONT1 to the scanning driver 400, the emission control signals CONT3 to the emission driver 700, and the data control signals CONT2 and output image signals DAT to the data driver 500.

The scanning control signals CONT1 include a scanning start signal STV for instructing to start scanning of the high voltage Von into the scanning signal lines $G_1$ to $G_n$ and at least one clock signal for controlling an output period of the high voltage Von. The scanning control signals CONT1 may further include an output enable signal OE for defining the duration of the high voltage Von.

The data control signals CONT2 include a horizontal synchronization start signal STH for notifying the start of transmission of the digital output image signals DAT for a row of pixels PX, a load signal LOAD for instructing to apply analog data voltages to the data lines $D_1$ to $D_m$, and a data clock signal HCLK.

The emission control signals CONT3 include a synchronization signal for instructing to start the scanning of the high voltage Von into the emission signal lines $S_1$ to $S_n$ and at least one clock signal for controlling output of the high voltage Von. The emission control signals CONT3 may further include a signal for defining the duration of the high voltage Von.

The following description will be focused on one exemplary pixel row, for example, on the i-th pixel row.

With reference to FIGS. 1 and 4, responsive to the data control signals CONT2 from the signal controller 600, the data driver 500 receives digital output image signals DAT for the i-th row of pixels PX, converts the output image signals DAT to analog data voltages Vdat, and applies the analog data voltages Vdat to the corresponding data lines $D_1$ to $D_m$.

Within period T1, the scanning driver 400 converts the scanning signal $Vg_i$ applied to the scanning signal line $G_i$ into the high voltage Von according to the scanning control signals CONT1 from the signal controller 600, and the emission driver 700 converts the emission signal $Vs_i$ applied to the emission signal line $S_i$ into the high voltage Von, according to the emission control signals CONT3 from the signal controller 600.

Then, with reference to FIG. 3, the switching transistors Qs1, Qs3, and Qs4 are turned on and the switching transistors Qs2 and Qs5 are turned off.

FIG. 5 shows an equivalent circuit of a pixel PX in the above-described state, and this period is referred to as an initialization period T1.

As shown in FIG. 5, the data voltage Vdat is applied to the node N1, and the sustain voltage Vsus is applied to the node N2. The voltage difference between the nodes N1 and N2 is stored in the capacitor Cst. Although the driving transistor Qd is turned on and thus feeds a current, the organic light emitting element LD does not emit light since the transistor Qs5 is turned off.

Subsequently, the emission driver 700 changes the emission signal $Vs_i$ into the low voltage Voff, as shown in FIG. 4, so that the switching transistor Qs3 is turned off, and a compensation period T2 is started. Since the scanning signal $Vg_i$ is maintained at the high voltage (Von) level during the compensation period T2, the switching transistors Qs1 and Qs4 are maintained in the turn-on state and the switching transistors Qs2 and Qs5 are maintained in the turn-off state.

Then, with the switching transistor Qs3 turned off, the node N2 is separated from the sustain voltage Vsus as shown in FIG. 6. However, since the driving transistor Qd is maintained in the turn-on state, electrical charges stored in the capacitor Cst are discharged through the driving transistor Qd. The discharge continues until the voltage difference between the control terminal and the input terminal of the driving transistor Qd reaches a threshold voltage Vth of the driving transistor Qd. When the voltage difference corresponds to the threshold voltage Vth, the discharging of the charges stored in the capacitor Cst is stopped.

Therefore, a voltage $V_{N2}$ at the node N2 converges to a voltage value given by Equation 1.

$$V_{N2}=Vdd+Vth \qquad \text{[Equation 1]}$$

In this case, since the voltage $V_{N1}$ at the node N1 stays at the data voltage Vdat, the voltage stored in the capacitor Cst can become:

$$V_{N1}-V_{N2}=Vdat-(Vdd+Vth). \qquad \text{[Equation 2]}$$

Then, the scanning driver 400 turns off the switching transistors Qs1 and Qs4 and turns on the switching transistors Qs2 and Qs5 by changing the scanning signal $Vg_i$ to the low voltage Voff so that an emission period T3, shown in FIG. 4, is started. The emission signal $Vs_i$ still remains at the low voltage Voff level in the emission period T3, and therefore the switching transistor Qs3 is maintained in the turn-off state.

Then, the node N1 is separated from the data voltage Vdat and connected to the sustain voltage Vsus through the switching transistor Qs2, and the control terminal of the driving transistor Qd is floating, as shown in FIG. 7.

Therefore, the voltage $V_{N2}$ at the node N2 can be obtained as given in Equation 3.

$$V_{N2}=Vdd+Vth-Vdat+Vsus \qquad \text{[Equation 3]}$$

When the switching transistor Qs5 is turned on, the output terminal of the driving transistor Qd is connected to the organic light emitting element LD, and the driving transistor Qd outputs an output current $I_{LD}$ with a magnitude that varies in accordance with the voltage difference between the control terminal and the input terminal of the driving transistor Qd, as given in Equation 4.

$$\begin{aligned} I_{LD} &= 1/2\times K\times(Vgs-Vth)^2 \qquad \text{[Equation 4]}\\ &= 1/2\times K\times(V_{N2}-Vdd-Vth)^2\\ &= 1/2\times K\times(Vdd+Vth-Vdat+Vsus-Vdd-Vth)^2\\ &= 1/2\times K\times(Vdat-Vsus)^2, \end{aligned}$$

where K denotes a constant K (K=μ×Ci×W/L) determined by the characteristics of the driving transistor Qd, μ denotes a field effect mobility, Ci denotes a capacitance of a gate insulating layer of the driving transistor Qd, W denotes a channel width of the driving transistor Qd, and L denotes a channel length of the driving transistor Qd.

As given in Equation 4, the magnitude of the output current $I_{LD}$ in the emission period T3 is determined by the data voltage Vdat and the sustain voltage Vsus that is fixed. Therefore, the output current $I_{LD}$ is not affected by the threshold voltage Vth of the driving transistor Qd, and is thus not affected by any deviation in the threshold voltage Vth.

The output current $I_{LD}$ is supplied to the organic light emitting element LD, and the organic light emitting element LD emits light with an intensity that varies depending on the magnitude of the output current $I_{LD}$ to thereby display an image.

Therefore, a uniform image can be obtained even when a deviation occurs in the threshold voltages Vth of driving transistors Qd or when the threshold voltage Vth of a driving transistor Qd varies as a function of time.

The emission period T3 lasts until the initialization period T1 of the next frame for the i-th pixel row starts, and the operations in the respective periods T1 to T3 are repeated for the next row of pixels PX in the above-described manner. However, the initialization period T1 of the (i+1)-th pixel row is set to start after the compensation period T2 of the i-th pixel row is terminated. In the above-stated manner, the operations in the initialization period T1, the compensation period T2, and the emission period T3 are sequentially performed for all the scanning signal lines $G_1$ to $G_n$ and the emission signal lines $S_1$ to $S_n$ to thereby display the corresponding image on all the pixels PX.

The length of the respective periods T1 to T3 may be adjusted as necessary.

Simulation results in the presence of a deviation of the threshold voltages Vth of the driving transistors Qd of an organic light emitting device according to an exemplary embodiment of the present invention will be described with reference to FIGS. 8A and 8B.

Figure 8A:
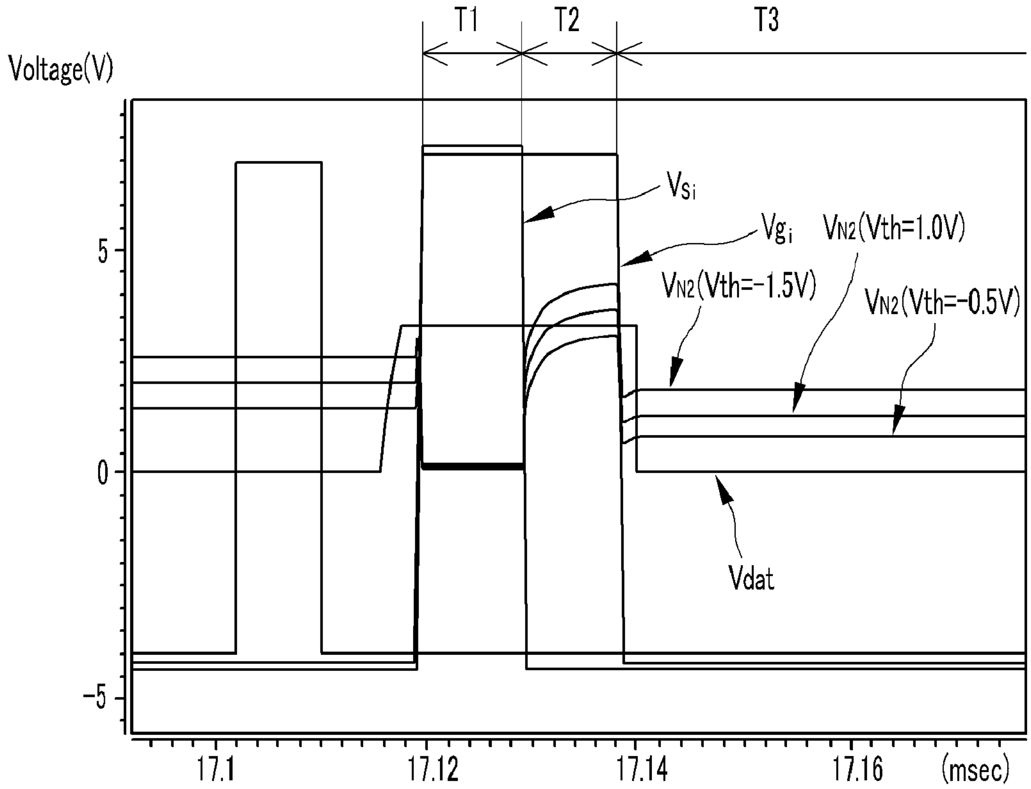
FIGS. 8A and 8B show waveforms of driving signals, the voltage at a node, and the output current of an exemplary embodiment of a driving transistor of an exemplary organic light emitting device according to the present invention.
Figure 8B:
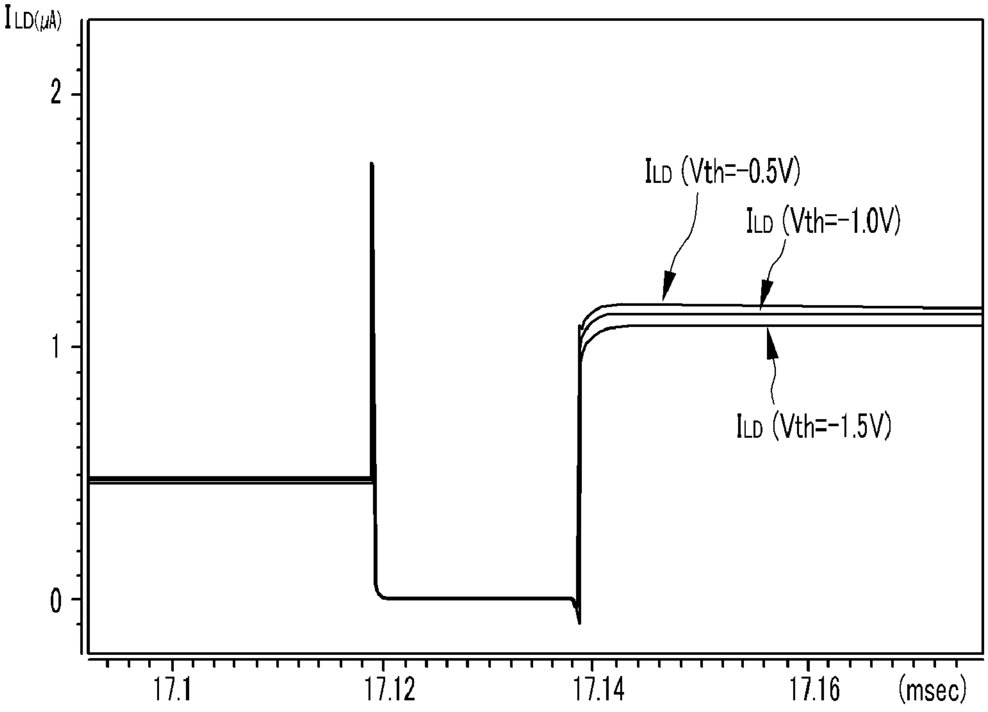

FIGS. 8A and 8B show waveforms of driving signals, the voltage of a node, and the output current of an exemplary driving transistor of an exemplary organic light emitting device for various threshold voltage levels according to an exemplary embodiment of the present invention.

The waveforms of FIGS. 8A and 8B show a voltage of the control terminal of the driving transistor Qd, which is the voltage $V_{N2}$ at the node N2, and the output current $I_{LD}$ when the threshold voltage Vth of the driving transistor Qd is set to −0.5V, −1.0V, and −1.5V. The simulation was performed by using a simulation program with integrated circuit emphasis ("SPICE"). The high voltage Von was set to approximately 7V, the low voltage Voff to about −4V, and the data voltage Vdat to about 2.5V. Under the simulation condition, the control terminal of the driving transistor Qd was supplied with voltages that are different by about −0.5V from each other, and the driving current $I_{LD}$ that flows to the organic light emitting element LD, however, was substantially constant.

The result of the simulation shows that the deviation of the threshold voltage Vth of the driving transistors Qd can be compensated by the organic light emitting device according to the exemplary embodiment of the present invention.

As described, the deviation of the threshold voltage of the driving transistors can be compensated by using a pixel circuit including only five switching transistors, one driving transistor, one capacitor, and one organic light emitting device, according to the exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:

a light emitting element that emits light having an intensity dependent on a magnitude of a driving current;

a capacitor connected between a first node and a second node;

a driving transistor outputting the driving current and having an input terminal connected with a first voltage, an output terminal, and a control terminal connected with the second node;

a first switching unit connecting the first node to one of a data voltage and a second voltage;

a second switching unit that switches a connection between the second voltage and the second node; and a third switching unit connecting the output terminal of the driving transistor to one of the second node and the light emitting element, wherein the first switching unit comprises: a first switch that switches a connection between the data voltage and the first node; and a second switch that switches a connection between the second voltage and the first node, wherein the second switching unit comprises a third switch, wherein the third switching unit comprises: a fourth switch that switches a connection between the second node and the output terminal of the driving transistor; and a fifth switch that switches a connection between the light emitting element and the output terminal of the driving transistor, wherein the first switch, the third switch and the fourth switch are field effect transistors including a first channel type, and the second switch, the fifth switch and the driving transistor are field effect transistors including a second channel type, and the second channel type being different from the first channel type, wherein the first, second, fourth, and fifth switches are controlled by a first control signal, and wherein the third switch is controlled by a second control signal different from the first control signal, and input terminals of the third switch and driving transistor are connected to different voltage sources.

2. The display device of claim 1, wherein the third switching unit connects the second node to the output terminal of the driving transistor while the first switching unit connects the data voltage to the first node.

3. The display device of claim 2, wherein the third switching unit connects the light emitting element to the output terminal of the driving transistor while the first switching unit connects the second voltage to the first node.

4. The display device of claim 3, wherein the second switching unit connects the second node to the second voltage and then disconnects the second node from the second voltage while the first switching unit connects the data voltage to the first node.

5. The display device of claim 4, wherein the capacitor stores a threshold voltage of the driving transistor while the first switching unit connects the data voltage to the first node and the third switching unit connects the second node to the output terminal of the driving transistor.

6. The display device of claim 1, wherein the first to fifth switches and the driving transistor comprise polysilicon.

7. The display device of claim 1, wherein the driving current is not dependent on a threshold voltage of the driving transistor.

8. The display device of claim 7, wherein the driving current depends on the data voltage and the second voltage.

9. The display device of claim 1, wherein the third switch is directly connected to both the driving transistor and the fourth switch.

10. A display device comprising:

a light emitting element;

a first capacitor connected between a first node and a second node;

a driving transistor having an input terminal connected with a first voltage, an output terminal, and a control terminal connected with the second node;

a first switching transistor controlled by a first control signal and connected between a data voltage and the first node;

a second switching transistor controlled by the first control signal and connected between a second voltage and the first node;

a third switching transistor controlled by a second control signal and connected between the second node and the second voltage;

a fourth switching transistor controlled by the first control signal and connected between the second node and the output terminal of the driving transistor; and a fifth switching transistor controlled by the first control signal and connected between the light emitting element and the output terminal of the driving transistor, wherein the first, third, and fourth switching transistors have a channel type that is different from a channel type of the second and fifth switching transistors and the driving transistor, and wherein the second control signal is different from the first control signal, and input terminals of the third switching transistor and driving transistor are connected to different voltage sources.

11. The display device of claim 10, wherein the driving transistor, the second switching transistor, and the fifth switching transistor are p-channel field effect transistors.

12. The display device of claim 10, wherein the first to fifth switching transistors and the driving transistor include polysilicon.

13. The display device of claim 10, wherein the first, third, and fourth switching transistors turn on and the second and fifth switching transistors turn off during a first period, the first and fourth switching transistors turn on and the second, third, and fifth switching transistors turn off during a second period following the first period, and the second and fifth switching transistors turn on and the first, third, and fourth switching transistors turn off during a third period following the second period.

14. The display device of claim 10, wherein the first control signal is a scanning signal from a scanning driver and the second control signal is a light-emission signal from an emission driver.

15. The display device of claim 10, wherein the third switching transistor is directly connected to both the driving transistor and the fourth switching transistor.

* * * * *